J. B. OKY.
Combined Stove Cover Lifter, Hammer, &c.
No. 64,247. Patented April 30, 1867.
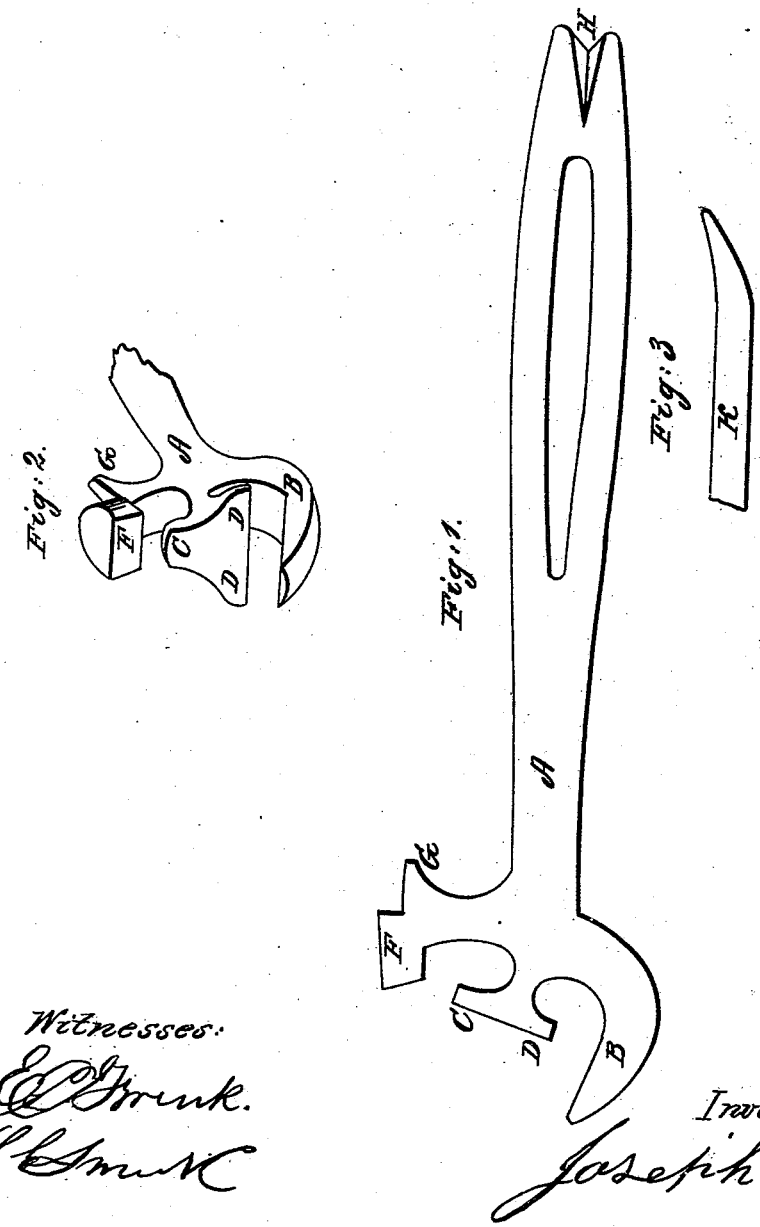

United States Patent Office.

JOSEPH B. OKY, OF INDIANAPOLIS, INDIANA, ASSIGNOR TO HIMSELF AND W. A. SCHOFIELD, OF SAME PLACE.

Letters Patent No. 64,247, dated April 30, 1867.

COMBINED STOVE-COVER LIFTER, HAMMER, &c.

*The Schedule referred to in these Letters Patent and making part of the same.*

TO ALL WHOM IT MAY CONCERN:

Be it known that I, JOSEPH B. OKY, of the city of Indianapolis, in the county of Marion, and State of Indiana, have invented a new and useful Stove Cover, Pot, Pan, Carpet-Tack Lifter, and Hammer; and I do hereby declare that the following is a full and exact description thereof, reference being had to the accompanying drawings, making a part of this specification.

The nature of my invention consists in a stove cover, pot, pan, carpet-tack lifter, and tack hammer combined, thereby making a complete apparatus for domestic use in the kitchen and elsewhere.

To enable others skilled in the art to make and use my invention, I will proceed to describe its construction.

It is made of iron or other suitable metal, having several peculiar-formed hooks and fulcra for lifting stove covers, pots, pans, plates, kettles, &c., as represented by Figure 1 of said drawings, also by letters D, B, C, G, and F; also the handle A provided with a bifurcated end, H, made for the purpose of raising tacks from the floor, &c.

Figure 2 represents a front view of said utensil. First, B a hook or stove-cover lifter. Second, letters D D represent lips extending over the sides of hook B, which are used so as to hold the plate or pan in a firm condition so that it can be moved without turning or shifting its position when held firmly in the hand by the handle A. Third, the front plate surface as represented by letter F on the hammer, together with the hook C, are also so constructed as to prevent turning or upsetting when held as above.

What I claim as my invention, and desire to secure by Letters Patent, is—

The utensil herein described, consisting of hook B, lips D D and C, hammer F, hook G, and handle A, provided with a bifurcated end H, arranged and combined as set forth.

JOSEPH B. OKY.

Witnesses:
S. C. FRINK,
E. O. FRINK.